(12) United States Patent
Aoki et al.

(10) Patent No.: US 7,937,295 B2
(45) Date of Patent: May 3, 2011

(54) PRODUCT PURCHASING METHOD, APPARATUS, AND COMPUTER PROGRAM PRODUCT

(75) Inventors: Takahiro Aoki, Tokyo (JP); Toru Kaneko, Chiba (JP); Rei Suda, Kawasaki (JP); Yoshiki Yamaguchi, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 11/471,127

(22) Filed: Jun. 20, 2006

(65) Prior Publication Data

US 2006/0293972 A1    Dec. 28, 2006

(30) Foreign Application Priority Data

Jun. 24, 2005   (JP) ................................ 2005-184749

(51) Int. Cl.
*G06Q 30/00* (2006.01)
(52) U.S. Cl. ..................................... 705/26.35; 705/64
(58) Field of Classification Search .................. 705/26, 705/27, 39, 40, 64, 79; 715/234
See application file for complete search history.

(56) References Cited

U.S. PATENT DOCUMENTS

| | | | | |
|---|---|---|---|---|
| 5,757,917 | A * | 5/1998 | Rose et al. ....................... 705/79 |
| 6,029,141 | A * | 2/2000 | Bezos et al. ..................... 705/27 |
| 6,330,575 | B1 * | 12/2001 | Moore et al. ................... 715/234 |
| 2002/0016765 | A1 * | 2/2002 | Sacks ................................ 705/39 |
| 2004/0111368 | A1 * | 6/2004 | Cuthbertson et al. ............ 705/40 |
| 2005/0256806 | A1 * | 11/2005 | Tien et al. ........................ 705/64 |

FOREIGN PATENT DOCUMENTS

| | | |
|---|---|---|
| JP | PUPA2001-160108 | 6/2001 |
| JP | PUPA2001-229127 | 8/2001 |
| JP | PUPA2001-344550 | 12/2001 |
| JP | 2002118551 A | 4/2002 |
| JP | PUPA2004-348398 | 12/2004 |

OTHER PUBLICATIONS

"Visa Europe: Barclaycard teams up with Visa to provide safer online shopping with Barclaycard Secure," M2 Presswire, Coventry: Jun. 1, 2005, p. 1 [retrieved on Dec. 17, 2010].*

* cited by examiner

*Primary Examiner* — Amee A. Shah
*Assistant Examiner* — Anne M Georgalas
(74) *Attorney, Agent, or Firm* — Schmeiser, Olsen & Watts; John Pivnichny

(57) ABSTRACT

A method, apparatus, and computer program product for transacting a product purchase by a user. The product purchase is processed by a purchase server that recorded a unique user identification and is connected to an information providing server and a client (connected to the user) via a network. The purchase server: receives (from the information providing server) purchase data including purchase identity information including a description of a product selected by the user for purchase; receives (from the client) redirect data comprising purchase identity information describing the selected product; sends (to the client) a request for the unique user identification; receives (from the client) identification data pertaining to the user; authenticates the received identification data pertaining to the user; and validates purchase identity information in the received redirect data. The purchase identity information in both the purchase data and the redirect data does not include the unique user identification.

16 Claims, 5 Drawing Sheets

FIG. 5

| USER ID | PASSWORD | UNIQUE IDENTIFICATION |
|---------|----------|----------------------|
| tom | abc | 00-00-00-00-00-15 |
| mark | 123 | 00-00-00-00-00-20 |

FIG. 6

| PURCHASE ITEM NUMBER | PURCHASE ITEM INFORMATION | | | INFORMATION PROVIDING SERVER INDIVIDUAL INFORMATION |
|---|---|---|---|---|
| | PRODUCT TO BE PURCHASED | PRICE | TIME OF PURCHASING | |
| 200505251 | O× CYCLE-RACE TRACK SECOND RACE PLACE BET 1-2 | 600 | 17:20 | 00-00-00-00-00-40 |

PRODUCT PURCHASING METHOD, APPARATUS, AND COMPUTER PROGRAM PRODUCT

FIELD OF THE INVENTION

The present invention relates to transaction of a product purchasing method using an information processing apparatus, and a computer program product for achieving the same. More specifically, the present invention relates to a product purchasing method and apparatus in processing purchasing of a product using the information processing apparatus, and a computer program product for achieving the same.

BACKGROUND OF THE INVENTION

Heretofore, a method and a system for achieving purchase of a product using an information processing apparatus such as a computer are known. Currently, in the purchase in such a system and a method, many kinds of products have become objects of purchasing. For example, in addition to the products such as home electronics, cosmetics, books or the like, products such as a pari-mutuel ticket of a bicycle race or a betting ticket of a horse race or the like have become objects of purchasing.

In a system for achieving such purchasing, a user specifies an URL (Uniform Resource Locator) of a site for providing purchase of a product, using a web browser. In other words, the user performs a procedure of purchase of the products from a product purchase site.

However, authentication of the user is inconvenient with current product purchase methods.

SUMMARY OF THE INVENTION

The present invention provides a method for transacting a product purchase by a user via processing of the product purchase by a purchase server, a unique identification of the user having been previously recorded by the purchase server, said method comprising:

receiving, by the purchase server from an information providing server, purchase data comprising purchase identity information that includes a description of a product selected by the user for purchase, said purchase identity information in the purchase data not including the unique identification of the user;

receiving, by the purchase server from a client to which the user is connected, redirect data comprising purchase identity information describing the product selected by the user for purchase, said purchase identity information in the redirect data not including the unique identification of the user;

sending, by the purchase server to the client after said receiving the purchase data and said receiving the redirect data have been performed, a request for the unique identification of the user;

receiving, by the purchase server from the client after said sending the request for the unique identification of the user has been performed, identification data pertaining to the user;

authenticating, by the purchase server, the received identification data pertaining to the user;

validating, by the purchase server, purchase identity information in the received redirect data, wherein the purchase server is independently connected to the client and the information providing server via a communication line network.

The present invention provides an apparatus for transacting a product purchase by a user via processing of the product purchase by a purchase server, a unique identification of the user having been previously recorded by the purchase server, said method comprising:

means for receiving, by the purchase server from an information providing server, purchase data comprising purchase identity information that includes a description of a product selected by the user for purchase, said purchase identity information in the purchase data not including the unique identification of the user;

means for receiving, by the purchase server from a client to which the user is connected, redirect data comprising purchase identity information describing the product selected by the user for purchase, said purchase identity information in the redirect data not including the unique identification of the user;

means for sending, by the purchase server to the client after said receiving the purchase data and said receiving the redirect data have been performed, a request for the unique identification of the user;

means for receiving, by the purchase server from the client after said sending the request for the unique identification of the user has been performed, identification data pertaining to the user;

means for authenticating, by the purchase server, the received identification data pertaining to the user;

means for validating, by the purchase server, purchase identity information in the received redirect data, wherein the purchase server is independently connected to the client and the information providing server via a communication line network.

The present invention provides a method for transacting a product purchase by a user via processing of the product purchase by an information providing server, said method comprising:

receiving, by the information providing server from a client to which the user is connected, a request for product providing data describing a product identified by the user;

sending, by the information providing server to the client, the requested product providing data;

receiving, by the information providing server from the client after said sending the requested product providing data to the user has been performed, an indication that the user has selected the product for purchase;

sending, by the information providing server to a purchase server, purchase data comprising purchase identity information that includes a description of the product selected by the user for purchase, said purchase identity information in the purchase data not including a unique identification of the user;

sending, by the information providing server to the client, redirect data comprising purchase identity information describing the product selected by the user for purchase, said purchase identity information in the redirect data not including the unique identification of the user, wherein the information providing server is independently connected to the client and the purchase server via a communication line network.

The present invention provides an apparatus for transacting a product purchase by a user via processing of the product purchase by an information providing server, said method comprising:

means for receiving, by the information providing server from a client to which the user is connected, a request for product providing data describing a product identified by the user;

means for sending, by the information providing server to the client, the requested product providing data;

means for receiving, by the information providing server from the client after said sending the requested product providing data to the user has been performed, an indication that the user has selected the product for purchase;

means for sending, by the information providing server to a purchase server, purchase data comprising purchase identity information that includes a description of the product selected by the user for purchase, said purchase identity information in the purchase data not including a unique identification of the user;

means for sending, by the information providing server to the client, redirect data comprising purchase identity information describing the product selected by the user for purchase, said purchase identity information in the redirect data not including the unique identification of the user, wherein the information providing server is independently connected to the client and the purchase server via a communication line network.

The present invention advantageously provides a product purchase method in which authentication of the user is convenient.

BRIEF DESCRIPTION OF THE DRAWINGS

FIG. 5 is a diagram illustrating the relation between user information and unique identification with respect to the example of FIG. 4, in accordance with embodiments of the present invention.

FIG. 6 is a table illustrating purchase identity information with respect to the example of FIG. 4, in accordance with embodiments of the present invention.

DETAILED DESCRIPTION OF THE INVENTION

Figure 1:
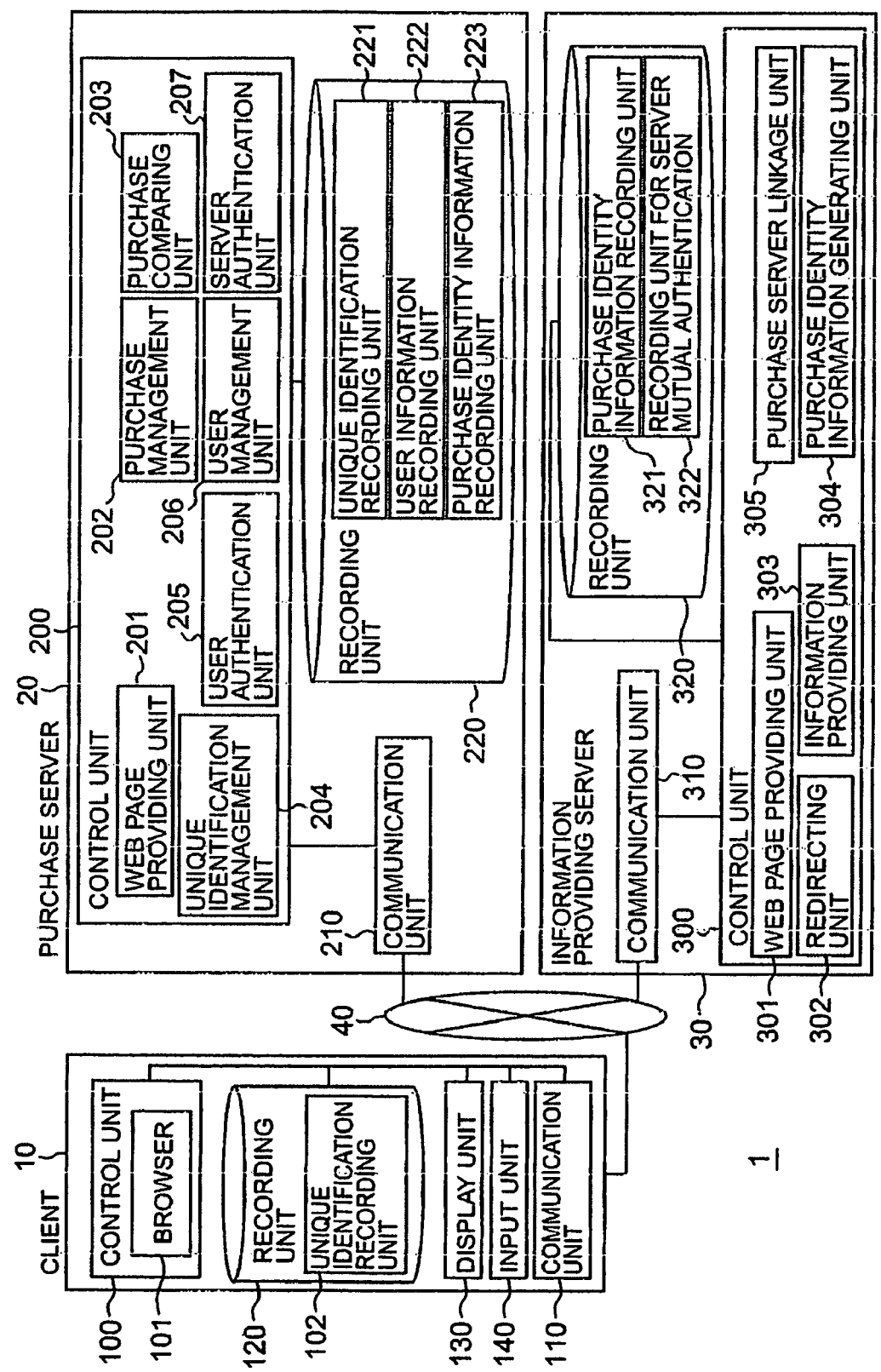
FIG. 1 is a block diagram illustrating a configuration of a product purchasing system for transacting a product purchase, in accordance with embodiments of the present invention.

The present invention will be hereinafter described through embodiments of the invention, however, the following embodiments do not limit the invention according to the claims, and all of the combinations of features described in the embodiments are not necessarily indispensable to the means to be solved in the invention.

The present invention facilitates the linkage on service between a product purchase site and an information providing site for providing the information on the product to be purchased at the product purchase site, to achieve the linked authentication processing therebetween, and thereby to provide a simple and safe product purchasing method and a computer program product for achieving the same.

According to the present invention, there is provided a method for performing purchase of a product by a client mutually connected to a first server for achieving purchase of a product, and a second server for providing information on the product, that includes the step of recording, by the first server, unique identification on the client, the step of sending, by the second server, the product providing data in response to a request of the client to the second server for product providing data containing the product information, the step of sending, by the second server, redirect data containing link information to the first server to the client in response to a purchase decision of the client based on the product providing data, the step of sending, by the client, based on the link information, the unique identification to the first server, and the step of authenticating, the first server, the unique identification sent from the client based on the recorded client unique identification.

Consequently, according to the present invention, the unique identification on the client is recorded in the first server, and in response to a purchase decision of a predetermined product of the client, the second server sends, to the client, the redirect data including the link information to the first server. Subsequently, the client automatically sends, based on the link information, the unique identification to the first server. The first server then authenticates the unique identification received, based on the unique identification recorded previously.

In other words, according to the present invention, the unique identification is only previously recorded in the first server for performing purchase of a product, and it is not necessary to authenticate the second server for providing the information concerning the product purchased at the first server, again. Hence, in the present invention, it is possible to achieve a linked authentication processing between servers.

More specifically, in addition to said configuration, there is provided a method including the step of, in response to the purchase decision of the client based on the product providing data, sending, by the client, purchase identity information concerning the purchase to the second server, the step of sending, the second server, the purchase identity information to the first server, the step of recording, the first server, the purchase identity information, the step of sending, by the client, based on the link information, the purchase identity information to the first server, and the step of comparing, the first server, the received purchase identity information and the recorded purchase identity information.

In other words, according to the present invention, it is possible to compare the purchase identity information first recorded on the first server and the purchase identity information sent from the client. Hence, it is possible to confirm validity of the purchase for every purchase item.

Further, as another configuration of the present invention, said purchase identity information is comprised of data including one or more groups containing the unique identification on the second server and purchase item information.

Accordingly, in this case, since the first server can compare the unique identification on the second server, the first server, after confirming the validity of the second server, can perform the final purchase for the client. As a result, it is possible to provide the product purchasing method for achieving more robust authentication as compared with a conventional method.

According to the present invention, it is possible to provide a simple and safe product purchasing method and a computer program product for achieving the same by improving a linkage on service between a product purchase site and an information providing site for providing information on a product to be purchased at the product purchase site to achieve the linked authentication processing therebetween.

FIG. 1 illustrates an example of a configuration of a product purchasing system 1 for transacting a product purchase, in accordance with embodiments of the present invention. In the product purchasing system 1, a client 10, a purchase server 20, and an information providing server 30 are mutually connected through a communication line network 40 (i.e., the client 10, the purchase server 20, and the information providing server 30 are independently connected to one another via the communication line network 40). The communication line network 40 may be the Internet, or may be any of a LAN (Local Area Network), a private line, or a network constituted by a combination thereof.

The client 10 is an information processing apparatus that displays product providing data sent from the information providing server 30, and performs purchase in response to a purchase instruction from a user. The client 10 is comprised of a control unit 100 for controlling information and data processed by the client 10, a communication unit 110 connected with the communication line network 40 to achieve communication, a recording unit 120 for recording the information and data processed by the client 10, a display unit 130 for displaying the information and data processed by the client 10, and an input unit 140 for receiving the input from the client 10. In addition, the client 10 may be an ordinary computer or may be a personal digital assistant such as a cellular phone.

The control unit 100 may be a central processing unit for controlling the client 10 such as a CPU (Central Processing Unit). The control unit 100 achieves a browser 101 by reading out a program recorded on the recording unit 120.

The browser 101 is provided with, as a function to provide the user who operates the client 10 with an interface for purchasing a product, a function to receive a web page sent from the purchase server 20 or the information providing server 30, display the web page in a predetermined form, and receive the input from the input unit 140.

The recording unit 120 may be a hard disk or a RAM (Random Access Memory), and includes an unique identification recording unit 102.

The unique identification recorded on the unique identification recording unit 102 is hardware identification information on a certain computer. More specifically, the unique identification on the client 10 is a sole number or symbol capable of discriminating the client 10 from other clients 10, or discriminating a user connected to the client 10 from other users, and is hardware recognition information. The unique identification on the client 10 comprises a unique identification of a user connected to the client 10. The unique identification may be, for example, an MAC (Media Access Control) address or a management number used for individual identification that is uniquely managed, issued and recorded on the client 10 as Cookie at the purchase server 20, and may be, in case of a cellular phone, the identification information assigned to each cellular phone career, or a serial number of an OS (Operating System).

The purchase server 20 is a server provided with a function as a WWW (World Wide Web) server. The purchase server 20 provides the user who operates the client 10 with the product purchase information via the communication line network 40, and achieves purchase of the product in response to the operation by the user. Here, products targeted for the purchase server 20 to achieve the purchase cover all of the products generally provided via the communication line. For example, in addition to the products that are generally purchased as Internet shopping such as home electronics, cosmetics, cars, furniture, books or the like, the products such as a pari-mutuel ticket of a bicycle race or a betting ticket of a horse race may be covered. In addition, the products targeted for achieving the purchase are not limited to articles, but those may include downloadable data such as a program product, image data, or video data.

The purchase server 20 is comprised of a control unit 200 for controlling the information and data processed by the purchase server 20, a communication unit 210 connected with the communication line network 40 to achieve the communication, and a recording unit 220 for recording the information and data processed by the purchase server 20.

The control unit 200 may be the central processing unit for controlling the purchase server 20 such as the CPU (Central Processing Unit). The control unit 200 achieves, by reading out the respective programs recorded on the recording unit 220, a web page providing unit 201, a purchase management unit 202, a purchase comparing unit 203, an unique identification management unit 204, a user authentication unit 205, a user management unit 206, and a server authentication unit 207.

The recording unit 220 may be a hard disk or a RAM (Random Access Memory), and includes an unique identification recording unit 221, a user information recording unit 222, and a purchase identity information recording unit 223. The information on each unit included in the recording unit 220 is not necessarily comprised of a single hardware as the recording unit 220, and may be managed by the individual recording unit or a database.

The web page providing unit 201 generates the web page, sends the generated web page to the client 10, and displays the web page on the browser 101 of the client 10. For example, the web page providing unit 201 provides the client 10 with the web page that prompts the user who operates the client 10 to input a user ID or a password, and provides the client 10 with the web page for displaying the detailed information after purchase of the product. The web page providing unit 201 may be achieved by a CGI (Common Gateway Interface).

The purchase management unit 202 manages purchase identity information. In other words, the purchase management unit 202 records and manages the purchase identity information sent from the information providing server 30.

The purchase identity information is data including unique identification on the information providing server 30 and purchase item information. Namely, the purchase identity information includes the purchase item information that is information concerning the purchase performed by the client 10 via the information providing server 30, and the unique identification on the information providing server 30 that has performed the purchase.

The purchase comparing unit 203 confirms the validity of the purchase identity information. The purchase comparing unit 203 confirms the validity of the purchase identity information by comparing the purchase identity information included in the URL (Uniform Resource Locator) generated by the information providing server 30 and the purchase identity information recorded on the purchase identity information recording unit 223.

The unique identification management unit 204 manages the unique identification on the client 10 and on the information providing server 30. The unique identification management unit 204 receives the unique identification from the client 10 and the information providing server 30, and records the unique identification on the unique identification recording unit 221 to manages the same. Receiving the access to the purchase server 20 from the client 10, the unique identification management unit 204 may, in order to acquire the unique identification on the client 10, send an inquiry request of the unique identification to the client 10.

The user authentication section 205, for every purchase transaction, authenticates the user who operates the client 10 based on the comparison of the unique identification sent from the client 10 and the unique identification on the client 10 recorded previously.

The user management unit 206 records and manages the user ID and the password inputted from the client 10. The user management unit 206 collaborates with the web page providing unit to achieve provision of the web page for prompting the user of the client 10 to input the user ID and the password. The user management unit 206 records the user ID and password inputted as the user information on the user information recording unit 222, and manages the recorded user information.

The server authentication unit 207 authenticates the information providing server 30. The server authentication unit 207 may be provided with a function to compare the unique identification of the information providing server 30, by being previously recorded on the unique identification recording unit 221, with the unique identification included in the purchase identity information for every purchase transaction. Additionally, as described below, the server authentication unit 207 may compare the purchase identity information sent from the client 10 and recorded thereon with the purchase identity information sent by a redirect access from the client 10, to authenticate the information providing server 30.

The information providing server 30 is a server provided with a function as the WWW (World Wide Web) server for providing the product information to the client 10. Here, the product targeted for the information providing server 30 to provide the information covers all of the products generally provided for shopping via the communication line. In other words, similarly with the products targeted by said purchase server 20, the target may include, for example, in addition to the products such as the home electronics, the cosmetics, the cars, the furniture, the books, or the like, the products such as a pari-mutuel ticket of a bicycle race or a betting ticket of a horse race may be targeted. In addition, the products targeted for providing the information are not limited to the articles, but those may include the downloadable data such as the program product, the image data, the audio data, or the video data.

The information providing server 30 is comprised of a control unit 300 for controlling the information processed by the information providing server 30, a communication unit 310 connected with the communication line network 40 to achieve the communication, and a recording unit 320 for recording the information processed by the information providing server 30.

The control unit 300 may be the central processing unit for controlling the information providing server 30 such as the CPU (Central Processing Unit). The control unit 300 includes a web page providing unit 301, a redirecting unit 302, an information providing unit 303, a purchase identity information generating unit 304, and a purchase server linkage unit 305.

The recording unit 320 may be a hard disk or a RAM (Random Access Memory), and includes a purchase identity information recording unit 321. The data and information recorded on the recording unit 320 may be managed by the database in which the recording unit 320 and the control unit 300 operate in cooperation. The recording unit 320 may include the purchase identity information recording unit 321 and a recording unit for server mutual authentication 322.

The web page providing unit 301 generates the web page to send the same to the client 10, and displays the web page on the browser of the client 10. For example, the web page providing unit 301 provides the client 10 with the product providing data, and provides the client 10 with the web page for achieving the product purchasing. The product providing data is data concerning the product to be purchased. The web page providing unit 301 may be achieved by the CGI (Common Gateway Interface).

The information providing unit 303 provides the information as content of the web page provided by the web page providing unit 301. That is, the information providing unit 303 and the web page providing unit 301 collaborate with each other to provide the browser of the client 10 with the information concerning the product. Here, the function provided by the information providing unit 303 may include a function to offer a recommended product, in addition to the function to provide the information concerning a product provided by the Internet shopping or the like.

The purchase identity information generating unit 304 generates the purchase identity information in response to the purchase decision of the client 10. The purchase identity information generating unit 304 generates the purchase identity information by adding the purchase item information and the unique identification of the information providing server 30 to the purchase information of the client 10. The purchase item information is information including a purchased product name, product number, price thereof, a time stamp of the time when the product was purchased, and a random number for specifying a purchase item. In addition, in the purchase identity information, single purchase identity information does not always correspond to the purchase of a single product, and single purchase identity information may correspond to a plurality of products purchased.

The purchase server linkage unit 305 sends purchase identity information to the purchase server 20, and receives purchase identity acceptance data sent from the purchase server 20 that received this purchase identity information. The purchase server linkage unit 305 achieves a linkage between the information providing server 30 and the purchase server 20. In addition, the purchase server linkage unit 305 may be provided with a function to cause the purchase server 20 to record the unique identification of the information providing server 30 before the purchase from the client 10 starts. Here, the purchase server linkage unit 305 may use a communication protocol of SOAP (Simple Object Access Protocol) between the purchase server 20 and the information providing server 30.

In response to the access from the client 10, the redirecting unit 302 redirects to the purchase server 20 from the information providing server 30. That is, the redirecting unit 302 generates redirect data and sends the generated redirect data to the client 10. Here, the redirection means that, when the client 10 accesses the server specified by the unique address (for example, the URL), the client may automatically access the server (this may be physically the same server as or different from the former server) specified by the other address based on link information. The redirection may be, for example, a HTTP (Hyper Text Transfer Protocol) redirection. As for the redirection according to the present embodiment, the browser 101 of the client 10 receives the redirect data of the HTTP redirection from the information providing server 30 and the client 10 accesses the purchase server 20 specified by the redirected URL, and thereby, the redirection is achieved.

Further, the redirect data is data that the client 10 acquires through access of the browser 101 of the client 10 to the information providing server 30 so that the access is redirected to the purchase server 20. The client 10 having received the redirect data accesses the purchase server 20 specified by the redirected URL. Hence, the redirect data includes the link information for accessing the purchase server 20. In the preferred embodiment according to the present invention, the redirect data includes said purchase identity information, in addition to the link information.

Figure 2:
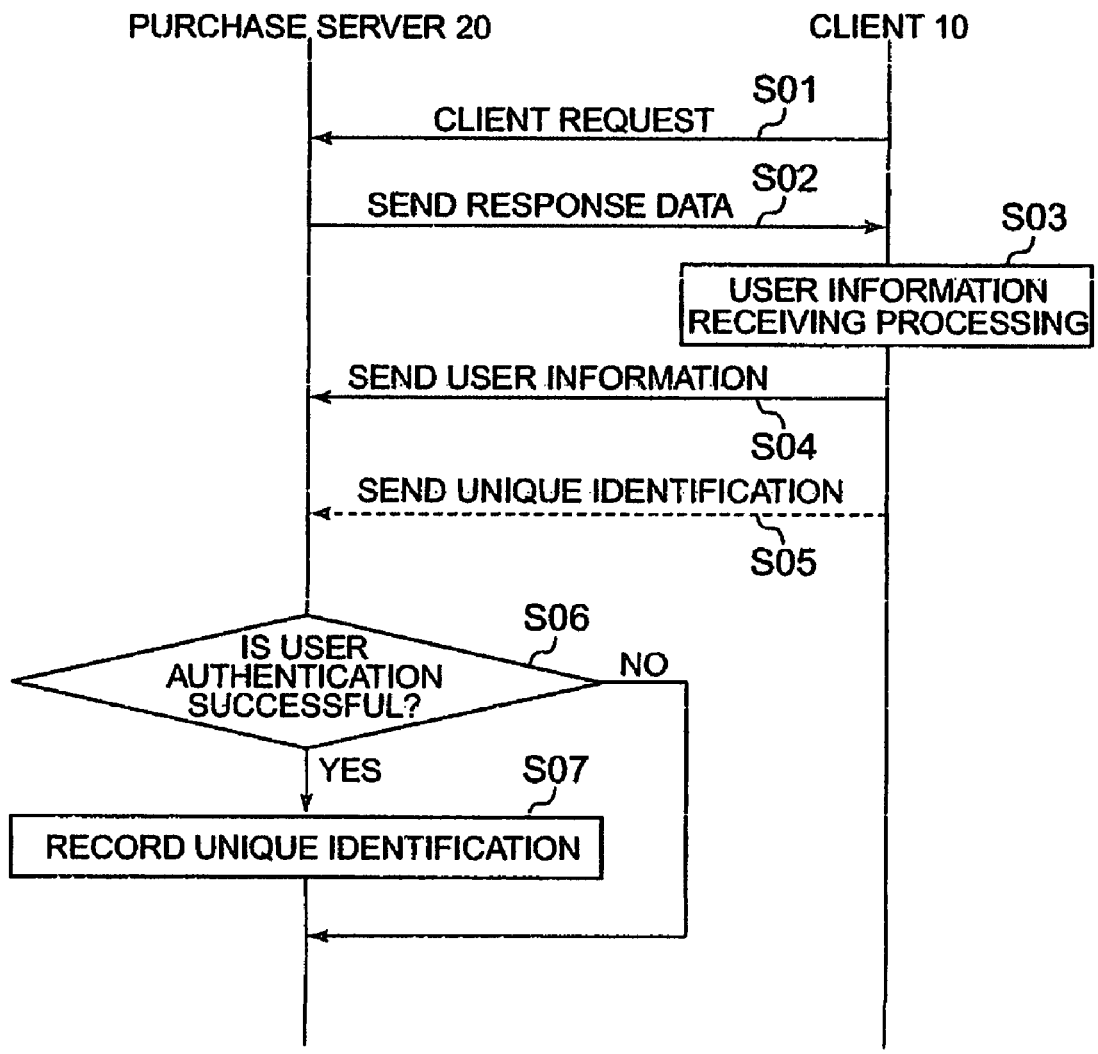
FIG. 2 is a flow chart illustrating an identification recording processing, in accordance with embodiments of the present invention.

Next, a flow in case that the client 10 and the purchase server 20 perform unique identification recording processing will be described based on FIG. 2. The unique identification recording processing is processing performed when firstly accessed by the client 10 that has not been registered yet on the purchase server 20. In the present embodiment, there will be provided a description of a case that a user whose information is already recorded by the user management unit 206 uses a terminal of the client 10 to access the purchase server 20 for the first time. In addition, the dashed arrows in the flowcharts in FIGS. 2 and 3 indicate that transmission of each data is performed not as the transmission explicit to the user but as the processing inside the server (back-end processing).

The client 10 accesses the purchase server 20, and sends a client request for inputting the user information (Step S01). The purchase server 20 receives the client request and sends response data for prompting the input of the user information (Step S02). The client 10 displays the response data received on the browser 101. The client 10 then performs user information receiving processing (Step S03). Namely, the client 10 receives the input of the user information by the user via the input unit 140, and when the input of the user ID or the password is actually received, the process proceeds to Step S04.

The client 10 sends the user information inputted to the purchase server 20 (Step S04). The client 10 then sends the unique identification of the user connected to the client 10 (Step S05). At this moment, the client 10 may automatically perform the transmission of the unique identification without making the user conscious of the transmission.

The purchase server 20 authenticates the user based on the user information received (Step S06). Based on the user information already recorded on the user information recording unit 222, the purchase server 20 authenticates the user.

When the user authentication is successful, the purchase server 20 records the unique identification of the user connected to the client 10 on the unique identification recording unit 221 (Step S07).

Figure 3:
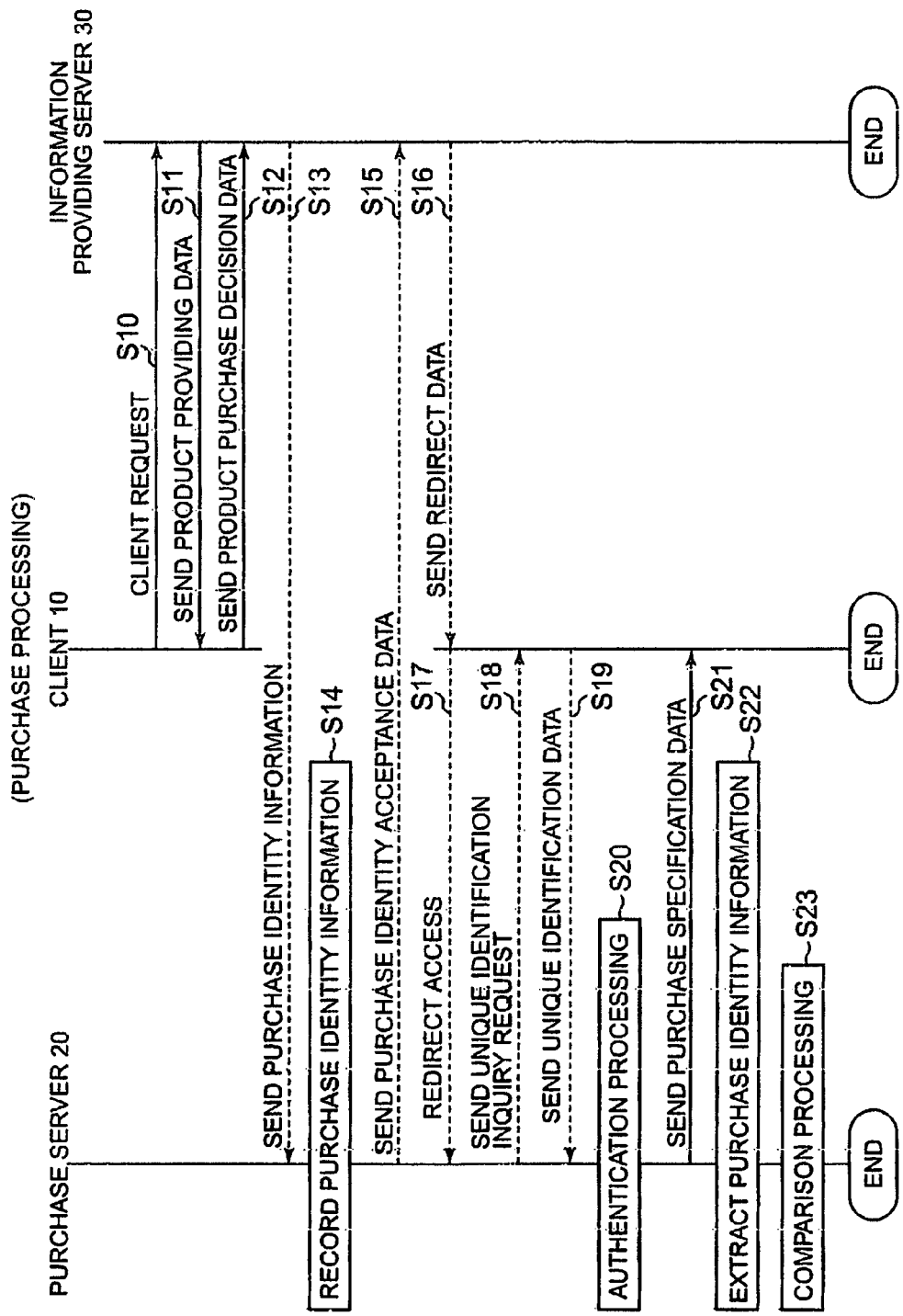
FIG. 3 is a flowchart illustrating a method for transacting a product purchase, in accordance with embodiments of the present invention.

The purchase processing will be now described based on FIG. 3 wherein the user performs the product purchase via the client 10 on which the unique identification of the user is recorded.

FIG. 3 is a flowchart illustrating a method for transacting a product purchase, in accordance with embodiments of the present invention. In FIG. 3, the client 10 sends the client request for requesting the product providing data to the information providing server 30 (Step S10). The product providing data describes the product identified by the user. The information providing unit 303 of the information providing server 30 receives the client request and thereby sends the product providing data to the client 10 (Step S11).

The user browses the product providing data and determines the purchase of the predetermined product. In response to this, product purchase decision data, indicating that the user has selected the product for purchase, is sent from the client 10 to the information providing server 30 (Step S12). The information providing server 30 receives the product purchase decision data. Subsequently, the purchase identity information generating unit 304 of the information providing server 30 generates purchase data comprising the purchase identity information concerning the product. The purchase identity information does not include the unique identification of the user as may be seen in the example of FIG. 6, described infra. The purchase server linkage unit 305 of the information providing server 30 then sends the purchase identity information generated to the purchase server 20 (Step S13). The purchase server 20 receives the purchase identity information sent, and records the purchase identity information on the purchase identity information recording unit 223 (Step S14). The purchase server 20, in response to acceptance of the purchase identity information, sends the purchase identity acceptance data to the information providing server 30 (Step S15).

In response to reception of the purchase identity acceptance data, the redirecting unit 302 of the information providing server 30 sends the redirect data to the client 10 (Step S16). The redirect data comprises purchase identity information describing the product selected by the user for purchase. The purchase identity information in the redirect data does not include the unique identification of the user. The client 10, in response to reception of the redirect data from the information providing server 30, performs the redirect access to the purchase server 20 based on the link information included in the redirect data (Step S17). The redirect access herein may be an access by which all or a part of the redirect data is sent to the purchase server 20.

Receiving the redirect access by the client 10, the unique identification management unit 204 of the purchase server 20 sends the inquiry request of the unique identification for the purpose of acquiring the unique identification data pertaining to the user connected to the client 10 (Step S18). Upon receiving the inquiry request, the client 10 sends the unique identification data, pertaining to the user connected to the client 10, to the purchase server 20 (Step S19).

The user authentication unit 205 of the purchase server 20 authenticates the unique identification (pertaining to the user connected to the client 10) sent, based on the unique identification previously recorded on the unique identification recording unit 221 (Step S20). In Step S20, the authentication comprises comparing the received identification data pertaining to the user in Step S19 with the recorded unique identification of the user in Step S07 (see FIG. 2) to confirm that the received identification data pertaining to the user in Step S19 matches the recorded unique identification of the user in Step S07. When the authentication is successful, the purchase server 20 sends purchase specification data to the client 10 (Step S21). The purchase specification data is data representing purchase specification of the product specified by the user. Here, when the authentication is unsuccessful, it is determined that the client 10 is an invalid client, and the product purchase processing will be terminated.

In addition, the processes from Step S13 to Step S19 (processing represented by a dashed line in FIG. 3) will be automatically performed without making the user who operates the client 10 conscious of the processes. In other words, when the product purchase decision data is sent from the client 10 to the information providing server 30, the purchase specification data sent from the purchase server 20 is displayed on the screen of the client 10. For this reason, the user of the client 10 can perform purchase of the product without being aware of accessing either the information providing server 30 or the purchase server 20.

Subsequently, the purchase comparing unit 203 of the purchase server 20 validates the purchase identity information in the received redirect data of Step S17, by extracting the purchase identity information recorded on the purchase identity information recording unit 223 based on the redirect data received from the client by the redirect access (Step S22). In Step S23, based on the extracted purchase identity information, the purchase comparing unit 203 compares the purchase identity information in the received redirect data of Step S17 with the purchase identity information in the received purchase data of Step S13 to confirm that the purchase identity information in the received redirect data of Step S17 comprises the purchase identity information in the received purchase data of Step S13.

Figure 4:
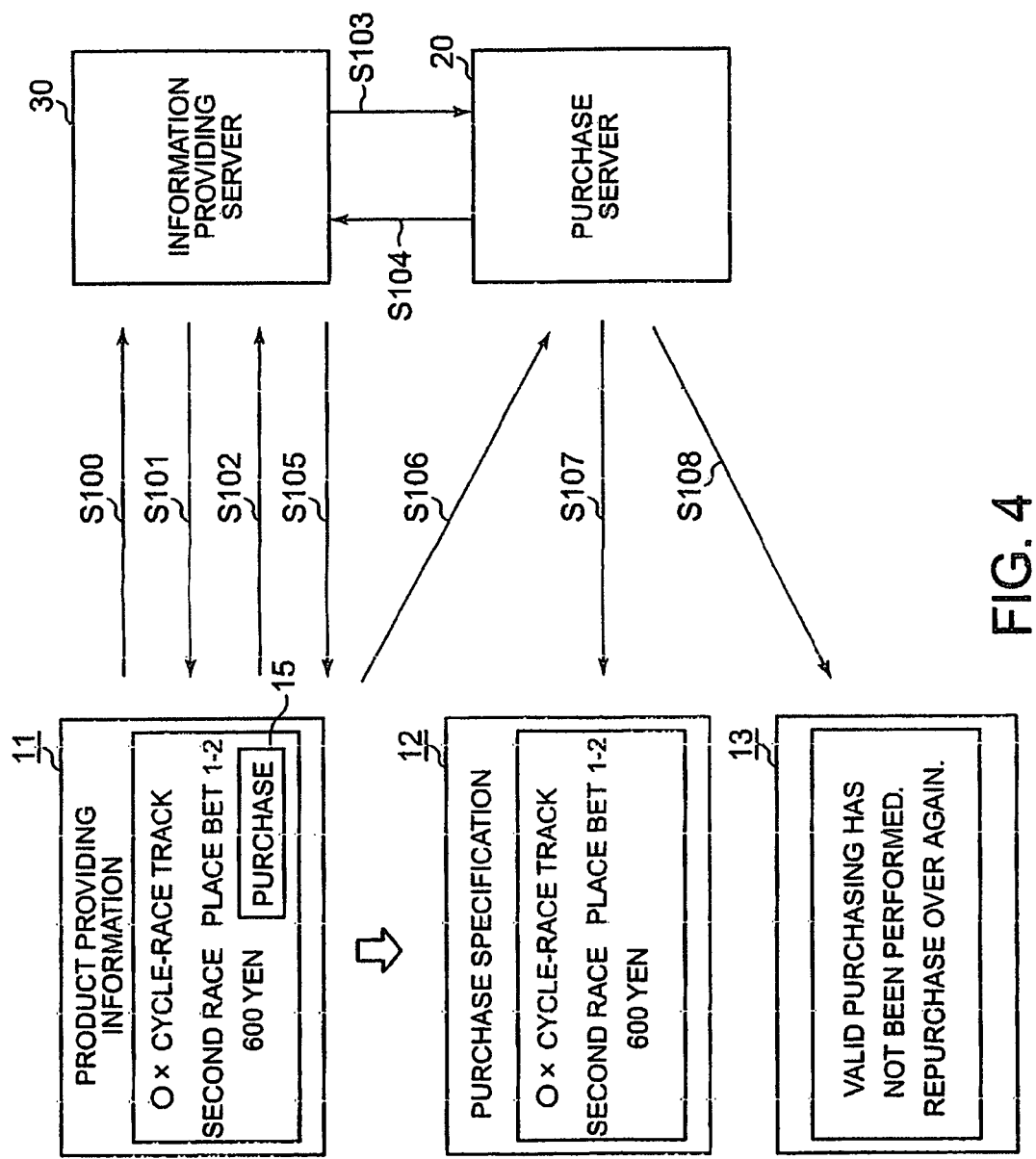
FIG. 4 is a diagram of the product purchasing configuration of FIG. 1 illustrating an example of a purchase of a parimutuel ticket of a bicycle race, in accordance with embodiments of the present invention.

Next, purchasing of a concrete product will be described based on FIGS. 4 through 6. Hereinafter, there will be provided a description of a product purchasing system by the purchase server 20 in which the product to be purchased is the pari-mutuel ticket of the bicycle race, and by the information providing server 30 which provides the information on the cycle race.

First, by registering the user ID and the password on the purchase server 20 as the user, the user can record the user ID and the password on the purchase server 20. The user then accesses the purchase server 20 using the client 10. In this case, the purchase server 20 prompts the user to input the user ID and the password, and when the password authentication is successful in response to input from the user, the purchase server 20 records the unique identification of the client 10. According to the description based on FIG. 5, the user ID "tom" inputs the password "abc" from the client 10 and thereby, the purchase server 20 authenticates the user information. When the authentication is successful, the purchase server 20 records the unique identification (00-00-00-00-00-15) of the client 10 on the unique identification recording unit 221 as being related to the user information. When the unique identification of the client 10 has already been recorded on the purchase server 20, it is not necessary to process the transmission and recording of the unique identification of the client 10. In summary, said processing is processing in case that the user firstly accesses the purchase server 20 from the client 10.

Subsequently, the user accesses the information providing server 30 for the purpose of acquiring the information on the pari-mutuel ticket. As shown in FIG. 4, the client 10 accesses the information providing server 30 (Step S100), and acquires the information (product providing data) concerning the pari-mutuel ticket (Step S101). The product providing information 11 is actually displayed on the browser of the client 10. Subsequently, the user clicks a purchase button 15 in order to determine to purchase the pari-mutuel ticket of "OX car race track, second race, place bet 1-2", and thereby, the client 10 sends the product purchase decision data to the information providing server 30 (Step S102).

The information providing server 30 then sends the purchase identity information to the purchase server 20 (Step S103). The purchase identity information may be a table shown in FIG. 6. Namely, the purchase identity information in the table of FIG. 6 includes the purchase item information, and the unique identification of the information providing server 30. Thus, the purchase identity information in the redirect data (Steps S16 and S17 of FIG. 3) and the purchase identity information in the purchase data (Step S12 of FIG. 3) may each comprise a unique identification of the information providing server 30. The purchase item information in the table of FIG. 6 includes a purchase item number, a purchasing product, price thereof, and time when a product was purchased. The purchase server 20 having received the purchase identity information sends the purchase identity information acceptance data to the information providing server 30 (Step S104). In response to reception of the purchase identity information acceptance data, the information providing server 30 sends the redirect data to the client 10 (Step S105), and the client 10 performs the redirect access to the purchase server 20 (Step S106). In this case, the unique identification is sent to the purchase server 20 from the client 10, and the purchase server 20 in turn authenticates the unique identification of the user connected to the client 10.

The purchase server 20 then compares the purchase identity information. In the comparison, the information providing server 30 is also compared from the unique identification (the unique identification of the information providing server, 00-00-00-00-00-40, in FIG. 6) of the information providing server 30. When the comparison is successful, the purchase specification 12 is then displayed on the browser of the client 10 (Step S107). When the authentication of the unique identification is unsuccessful or when the comparison of the purchase identity information is unsuccessful, the purchase server 20 may display that the valid purchase is not performed (unsuccessful purchase information 13) on the browser of the client 10 (Step S108).

In addition, when the purchase server 20 authenticates the information providing server 30, it may not necessary to apply a method for authenticating the unique identification of the information providing server 30 as described above. For example, it may be possible to adopt a method for authenticating the information providing server 30 based on the information (for example, an electronic signature using a PKI (public key infrastructure)) recorded on the recording unit for server mutual authentication 322. In this case, by making the purchase identity information to include the electronic signature of the information providing server 30, the electronic signature is decoded by a public key to authenticate the information providing server 30, when the server authentication unit 207 compares the purchase identity information. Thus, the purchase identity information in the redirect data (Steps S16 and S17 of FIG. 3) and the purchase identity information in the purchase data (Step S12 of FIG. 3) may each comprise an electronic signature of the information providing server 30, wherein the electronic signature, is decoded by the purchase server 20, through use of a public key associated with the electronic signature.

Here, between the information providing server 30 and the purchase server 20, the server linkage protocol such as the SOAP may be used, or XML (eXtensible Markup Language) data may be used as data such as the purchase identity information.

For the user who operates the client 10, since it is possible to achieve purchasing of the product provided by the purchase server 20 only by accessing the information providing server 30 and clicking the purchase button 15, it is possible to improve conveniences more than ever before. In addition, improvement of conveniences as more than ever before enables to increase the number of the user using the purchase server 20, and to achieve purchase of many products.

As described above, according to the embodiments of the present invention, the user who uses the client 10 is authenticated in cooperation between the information providing server 30 and the purchase server 20. For this reason, by performing the authentication processing at the purchase server 20, the user may not need to perform the authentication processing at the information providing server 30. Further, the purchase identity information compared by the purchase server 20 includes the unique identification of the information providing server 30. Hence, the purchase server 20 can also compare the information providing server 30. As a result, according to the preferred embodiments of the present invention, it is possible to achieve a robust authentication including the authentication of the information providing server 30.

Additionally, according to the preferred embodiments of the present invention, even when the user, in performing purchase of the product, uses, for example, a shared client installed in an Internet cafe or the like instead of the userdedicated client, it is possible to achieve safe purchase. In other words, the unique identification of the client is not sent from the client until the authentication of the user information is successful. Furthermore, in performing purchase of the product, the purchase server can achieve the purchase after authenticating the unique identification of the client. Hence, even if the client is the shared client that the user firstly uses, it is possible to safely purchase the product from the client.

The program provided to the purchase server 20 and the information providing server 30 and executed therein may be, as a functional configuration, provided with a device driver, a module for reading the processing contents, an execution module, and an OS processing module. Moreover, the program provided to the purchase server 20 and the information providing server 30 is stored in a program recording medium, such as a flexible disk, a CD-ROM, or an IC memory card, and is provided to the user. The program is read out on the program recording medium, and installed in the purchase server 20 and the information providing server 30 to be executed.

The description has been made using the preferred embodiments of the present invention, however, the technical scope of the present invention is not limited to a range described in said embodiments. A wide variety of changes or improvements can be added to said embodiments. It is apparent from the description of the claims that a mode in which such changes or improvements have been made may also be included in the technical scope of the present invention.

What is claimed is:

1. A method for transacting a product purchase by a user via processing of the product purchase by a purchase server, said method comprising:
    a processor of the purchase server receiving, from a client to which the user is connected, a unique identification of the user;
    responsive to said receiving the unique identification of the user, said processor of the purchase server authenticating the user by confirming that the received unique identification of the user matches information already recorded on a data storage unit of the purchase server;
    responsive to said authenticating the user, said processor of the purchase server recording the received unique identification of the user on the data storage unit of the purchase server;
    after said recording the received unique identification of the user, said processor of the purchase server receiving, from an information providing server, purchase data comprising first purchase identity information pertaining to a product selected to be purchased by the user, wherein the first purchase identity information includes a unique identification of the information providing server and purchase item information comprising a product name of the product, a product number of the product, a purchase price of the product, and a random number pertaining to the product purchase, and wherein the first purchase identity information in the purchase data does not include the unique identification of the user;
    responsive to said receiving purchase data from the information providing server, said processor of the purchase server sending purchase identity acceptance information to the information providing server after which the purchase server is linked to by the client;
    responsive to said receiving purchase data from the information providing server and before the purchase server is linked to by the client, said processor of the purchase server recording the first purchase identity information on the data storage unit of the purchase server;
    after the purchase server is linked to by the client, said processor of the purchase server receiving, from the client, redirect data comprising second purchase identity information that includes the unique identification of the information providing server, the product name, the product number, the purchase price, and the random number, wherein the redirect data does not include the unique identification of the user;
    responsive to said receiving the redirect data from the client, said processor of the purchase server sending, to the client, a request for the unique identification of the user;
    after said sending the request for the unique identification of the user, said processor of the purchase server receiving, from the client, identification data pertaining to the user;
    said processor of the purchase server authenticating the received identification data pertaining to the user by confirming that the received identification data includes the unique identification of the user recorded on the data storage unit of the purchase server;
    after said authenticating the received identification data pertaining to the user, said processor of the purchase server sending to the client purchase specification data comprising a purchase specification of the product;
    after said sending the purchase specification data, said processor of the purchase server validating the second purchase identity information in the received redirect data, by confirming that the second purchase identity information in the received redirect data comprises the first purchase identity information in the received purchase data, said confirming implemented by comparing the second purchase identity information in the received redirect data with the first purchase identity information in the received purchase data, wherein said validating enables completion of the product purchase,
    wherein the purchase server is independently connected to the client and the information providing server via a communication line network.

2. The method of claim 1, wherein the second purchase identity information in the redirect data and the first purchase identity information in the purchase data each comprise an electronic signature of the information providing server, and wherein the method further comprises said processor of the purchase server decoding the electronic signature through use of a public key associated with the electronic signature.

3. The method of claim 1, wherein the communication line network comprises the Internet.

4. The method of claim 1,
    wherein the purchase data consists of the first purchase identity information;
    wherein the first purchase identity information consists of the unique identification of the information providing server and the purchase item information; and
    wherein the purchase item information consists of the product name, the product number, the purchase price, and the random number.

5. A method for transacting a product purchase by a user via processing of the product purchase by an information providing server, said method comprising:
    a processor of the information providing server receiving, from a client to which the user is connected, a request for product providing data describing a product identified by the user;

responsive to said receiving the request for product providing data, said processor of the information providing server sending, to the client, the requested product providing data;

after said sending the requested product providing data to the client, said processor of the information providing server receiving, from the client, product purchase decision data indicating that the user has selected the product for purchase;

responsive to said receiving the product purchase decision data from the client, said processor of the information providing server sending, to a purchase server, purchase data comprising first purchase identity information that includes a unique identification of the information providing server and purchase item information comprising a product name of the product, a product number of the product, a purchase price of the product, and a random number pertaining to the product purchase, and wherein the first purchase identity information in the purchase data does not include the unique identification of the user;

after said sending the purchase data to the purchase server, said processor of the information providing server receiving purchase identity acceptance data from the purchase server;

responsive to said receiving the purchase identity acceptance data from the purchase server, said processor of the information providing server sending, to the client, redirect data comprising second purchase identity information that includes the unique identification of the information providing server, the product name, the product number, the purchase price, and the random number, wherein the redirect data does not include the unique identification of the user;

after the purchase server is linked to by the client, a processor of the purchase server receiving, from the client, said redirect data that had been sent to the client;

responsive to receiving the redirect data from the client, said processor of the purchase server sending, to the client, a request for the unique identification of the user;

after said sending the request for the unique identification of the user, said processor of the purchase server receiving, from the client, identification data pertaining to the user;

said processor of the purchase server authenticating the received identification data pertaining to the user by confirming that the received identification data includes the unique identification of the user recorded on a data storage unit of the purchase server;

after said authenticating the received identification data pertaining to the user, said processor of the purchase server sending to the client purchase specification data comprising a purchase specification of the product;

after said sending the purchase specification data, said processor of the purchase server validating the second purchase identity information in the received redirect data, by confirming that the second purchase identity information in the redirect data comprises the first purchase identity information in the purchase data, said confirming implemented by comparing the second purchase identity information in the redirect data with the first purchase identity information in the purchase data, wherein said validating enables completion of the product purchase;

wherein the information providing server is independently connected to the client and the purchase server via a communication line network.

6. The method of claim 5, wherein the second purchase identity information in the redirect data and the first purchase identity information in the purchase data each comprise an electronic signature of the information providing server, and wherein the method further comprises said processor of the information providing server decoding the electronic signature through use of a public key associated with the electronic signature.

7. The method of claim 5, wherein the communication line network comprises the Internet.

8. The method of claim 5,
wherein the purchase data consists of the first purchase identity information;
wherein the first purchase identity information consists of the unique identification of the information providing server and the purchase item information; and
wherein the purchase item information consists of the product name, the product number, the purchase price, and the random number.

9. A computer program product, comprising a computer readable storage device having a computer readable program code stored therein, said computer readable program code upon being executed by a processor of a purchase server implements a method for transacting a product purchase by a user, said method comprising:

said processor of the purchase server receiving, from a client to which the user is connected, a unique identification of the user;

responsive to said receiving the unique identification of the user, said processor of the purchase server authenticating the user by confirming that the received unique identification of the user matches information already recorded on a data storage unit of the purchase server;

responsive to said authenticating the user, said processor of the purchase server recording the received unique identification of the user on the data storage unit of the purchase server;

after said recording the received unique identification of the user, said processor of the purchase server receiving, from an information providing server, purchase data comprising first purchase identity information pertaining to a product selected to be purchased by the user, wherein the first purchase identity information includes a unique identification of the information providing server and purchase item information comprising a product name of the product, a product number of the product, a purchase price of the product, and a random number pertaining to the product purchase, and wherein the first purchase identity information in the purchase data does not include the unique identification of the user responsive to said receiving purchase data from the information providing server, said processor of the purchase server sending purchase identity acceptance information to the information providing server after which the purchase server is linked to by the client;

responsive to said receiving purchase data from the information providing server and before the purchase server is linked to by the client, said processor of the purchase server recording first purchase identity information on the data storage unit of the purchase server;

after the purchase server is linked to by the client, said processor of the purchase server receiving, from the client, redirect data comprising second purchase identity information that includes the unique identification of the information providing server, the product name, the product number, the purchase price, and the random number, wherein the redirect data does not include the unique identification of the user;

responsive to said receiving the redirect data from the client, said processor of the purchase server sending, to the client, a request for the unique identification of the user;

after said sending the request for the unique identification of the user, said processor of the purchase server receiving, from the client, identification data pertaining to the user;

said processor of the purchase server authenticating the received identification data pertaining to the user by confirming that the received identification data includes the unique identification of the user recorded on the data storage unit of the purchase server;

after said authenticating the received identification data pertaining to the user, said processor of the purchase server sending to the client purchase specification data comprising a purchase specification of the product;

after said sending the purchase specification data, said processor of the purchase server validating the second purchase identity information in the received redirect data, by confirming that the second purchase identity information in the received redirect data comprises the first purchase identity information in the received purchase data, said confirming implemented by comparing the second purchase identity information in the received redirect data with the first purchase identity information in the received purchase data, wherein said validating enables completion of the product purchase, wherein the purchase server is independently connected to the client and the information providing server via a communication line network.

10. The computer program product of claim 9, wherein the second purchase identity information in the redirect data and the first purchase identity information in the purchase data each comprise an electronic signature of the information providing server, and wherein the method further comprises said processor of the purchase server decoding the electronic signature through use of a public key associated with the electronic signature.

11. The computer program product of claim 9, wherein the communication line network comprises the Internet.

12. The computer program product of claim 9,
wherein the purchase data consists of the first purchase identity information;
wherein the first purchase identity information consists of the unique identification of the information providing server and the purchase item information; and
wherein the purchase item information consists of the product name, the product number, the purchase price, and the random number.

13. A computer program product, comprising a computer readable storage device having a computer readable program code stored therein, said computer readable program code upon being executed by a processor of an information providing server implements a method for transacting a product purchase by a user, said method comprising:

said processor of the information providing server receiving, from a client to which the user is connected, a request for product providing data describing a product identified by the user;

responsive to said receiving the request for product providing data, said processor of the information providing server sending, to the client, the requested product providing data;

after said sending the requested product providing data to the client, said processor of the information providing server receiving, from the client, product purchase decision data indicating that the user has selected the product for purchase;

responsive to said receiving the product purchase decision data from the client, said processor of the information providing server sending, to a purchase server, purchase data comprising first purchase identity information that includes a unique identification of the information providing server and purchase item information comprising a product name of the product, a product number of the product, a purchase price of the product, and a random number pertaining to the product purchase, and wherein the first purchase identity information in the purchase data does not include the unique identification of the user;

after said sending the purchase data to the purchase server, said processor of the information providing server receiving purchase identity acceptance data from the purchase server;

responsive to said receiving the purchase identity acceptance data from the purchase server, said processor of the information providing server sending, to the client, redirect data comprising second purchase identity information that includes the unique identification of the information providing server, the product name, the product number, the purchase price, and the random number, wherein the redirect data does not include the unique identification of the user;

after the purchase server is linked to by the client, a processor of the purchase server receiving, from the client, said redirect data that had been sent to the client;

responsive to receiving the redirect data from the client, said processor of the purchase server sending, to the client, a request for the unique identification of the user;

after said sending the request for the unique identification of the user, said processor of the purchase server receiving, from the client, identification data pertaining to the user;

said processor of the purchase server authenticating the received identification data pertaining to the user by confirming that the received identification data includes the unique identification of the user recorded on a data storage unit of the purchase server;

after said authenticating the received identification data pertaining to the user, said processor of the purchase server sending to the client purchase specification data comprising a purchase specification of the product;

after said sending the purchase specification data, said processor of the purchase server validating the second purchase identity information in the received redirect data, by confirming that the second purchase identity information in the redirect data comprises the first purchase identity information in the purchase data, said confirming implemented by comparing the second purchase identity information in the redirect data with the first purchase identity information in the purchase data, wherein said validating enables completion of the product purchase;

wherein the information providing server is independently connected to the client and the purchase server via a communication line network.

14. The computer program product of claim 13, wherein the second purchase identity information in the redirect data and the first purchase identity information in the purchase data each comprise an electronic signature of the information providing server, and wherein the method further comprises said processor of the information providing server decoding the electronic signature through use of a public key associated with the electronic signature.

15. The computer program product of claim 13, wherein the communication line network comprises the Internet.

16. The computer program product of claim 13,
wherein the purchase data consists of the first purchase identity information;
wherein the first purchase identity information consists of the unique identification of the information providing server and the purchase item information; and
wherein the purchase item information consists of the product name, the product number, the purchase price, and the random number.

* * * * *